United States Patent
Mishra

(10) Patent No.: US 12,165,411 B2
(45) Date of Patent: Dec. 10, 2024

(54) CONTEXT AWARE WORD CLOUD FOR CONTEXT ORIENTED DYNAMIC ACTIONS

(71) Applicant: iStreamPlanet Co., LLC, Las Vegas, NV (US)

(72) Inventor: Nachiketa Mishra, Fremont, CA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 801 days.

(21) Appl. No.: 17/124,367

(22) Filed: Dec. 16, 2020

(65) Prior Publication Data

US 2022/0188549 A1  Jun. 16, 2022

(51) Int. Cl.
*G06V 20/40* (2022.01)
*G06F 40/35* (2020.01)
*G06N 20/00* (2019.01)

(52) U.S. Cl.
CPC .............. *G06V 20/46* (2022.01); *G06F 40/35* (2020.01); *G06N 20/00* (2019.01); *G06V 20/41* (2022.01)

(58) Field of Classification Search
CPC ........ G06V 20/46; G06V 20/41; G06F 40/35; G06N 20/00; G06N 3/044
See application file for complete search history.

(56) References Cited

U.S. PATENT DOCUMENTS

| | | |
|---|---|---|
| 9,924,404 B1 | 3/2018 | Salour et al. |
| 10,440,087 B2 | 10/2019 | Bader et al. |
| 10,977,711 B1 | 4/2021 | Verma et al. |
| 11,165,848 B1 | 11/2021 | Larson |
| 2012/0188882 A1 | 7/2012 | Wilkinson et al. |
| 2013/0279326 A1 | 10/2013 | Dunne et al. |
| 2013/0297780 A1 | 11/2013 | Sturrock et al. |
| 2016/0366202 A1 | 12/2016 | Phillips et al. |
| 2017/0272465 A1 | 9/2017 | Steele |
| 2019/0340437 A1* | 11/2019 | Smith, IV ............... G06V 20/41 |
| 2020/0211601 A1* | 7/2020 | Shanmuga Vadivel ...................... H04N 21/4316 |
| 2021/0160262 A1 | 5/2021 | Bynum et al. |
| 2022/0044022 A1* | 2/2022 | Gan ........................ G06V 20/46 |
| 2022/0138472 A1* | 5/2022 | Mittal .................... G06N 3/045 382/181 |
| 2022/0318349 A1* | 10/2022 | Wasnik ................... G06V 20/46 |

(Continued)

FOREIGN PATENT DOCUMENTS

| | | |
|---|---|---|
| EP | 1103114 B1 | 11/2008 |
| WO | 2017/144506 A1 | 8/2017 |

OTHER PUBLICATIONS

Non-Final Office Action, U.S. Appl. No. 17/124,370, Jan. 14, 2022, 8 pages.

(Continued)

*Primary Examiner* — Chan S Park
*Assistant Examiner* — Daniel C Chang
(74) *Attorney, Agent, or Firm* — Bookoff McAndrews, PLLC

(57) ABSTRACT

A method for generating context information for a video stream includes selecting a set of frames of a video stream, applying a first machine learning model to the set of frames to extract action information from the set of frames, applying natural language learning to the set of frames to identify dialogue associated with the set of frames, and generating context information to categorize the dialogue and action information for the set of frames.

20 Claims, 6 Drawing Sheets

(56) References Cited

U.S. PATENT DOCUMENTS

2022/0351516 A1* 11/2022 Vijayanarasimhan .................. G06V 20/41

OTHER PUBLICATIONS

Notice of Allowance, U.S. Appl. No. 17/124,370, Aug. 31, 2022, 12 pages.
Final Office Action, U.S. Appl. No. 17/124,370, May 5, 2022, 12 pages.
Notice of Allowance, U.S. Appl. No. 17/124,372, May 3, 2022, 7 pages.
ETSI Technical Report 101 290 V1.3.1 (Jul. 2014), "Digital Video Broadcasting (DVB); Measurement guidelines for DVB systems," ETSI, EBU, Jul. 2014, pp. 1-174.
Jonathan Stickel, "Data smoothing and numerical differentiation by a regularization method", Oct. 21, 2009, Computers and Chemical Engineering, 34, pp. 467-475 (Year: 2009).
Non-Final Office Action, U.S. Appl. No. 17/124,372, Oct. 14, 2021, 13 pages.
Advisory Action, U.S. Appl. No. 17/124,370, Jul. 7, 2022, 4 pages.
Non-Final Office Action, U.S. Appl. No. 17/899,460, Jun. 21, 2023, 9 pages.
Final Office Action, U.S. Appl. No. 17/124,372, Mar. 8, 2022, 14 pages.

* cited by examiner

CONTEXT AWARE WORD CLOUD FOR CONTEXT ORIENTED DYNAMIC ACTIONS

TECHNICAL FIELD

The embodiments of the invention are related to the field of managing video and image content. More specifically, the embodiments of the invention relate to methods and systems for determining context and content in audio and video.

BACKGROUND ART

Video can be utilized to capture information about a wide array of subject matter. Video can be used to capture sporting events, new events, scripted programming, and other types of content. This video is often distributed in a streaming format to end users having computing devices such as console devices, handheld devices, mobile devices, and similar devices that are capable of displaying video content in various formats, which can include accompanying audio. The video formats in which the video is distributed can vary and have a variety of characteristics related to the quality of the video and audio that may be included in metadata of the video formats.

Metadata included in a video format is manually added or represents basic information about the video format. The metadata is utilized to enable video transcoding and similar processes during the distribution process. Many devices, systems, and technologies related to audio/video can inspect the metadata of a video format, but because the information provided about the video data is limited to format characteristics such as bitrate, resolution, and similar characteristics, the use of the metadata is limited. The metadata can be utilized to identify the characteristics of a received video source. These characteristics can be utilized to identify a proper transcoder for the video source to reformate or similarly process the video source to be suitable for downstream devices.

The utility of metadata of video formats thus has limited range that is limited to encoding, decoding, reformatting and related processes. In some cases, the metadata can include information about a source, capture device, rights management and similar information. However, the metadata does not include information about the content or context of the associated video. The video is composed of a set of frames, where the frames are arrays of pixels that encode the image of the frame. The pixel information defines visual properties like color and brightness, but the frames provide no explicit information about the content of the image and video. Similarly, video also includes a set of audio tracks or similar audio information. The audio embedded in the video encodes sound that can be reproduced by a playback device. As with the image content in the video source, the audio information can have metadata that provides information about the audio encoding format, but does not provide information about the audio content.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
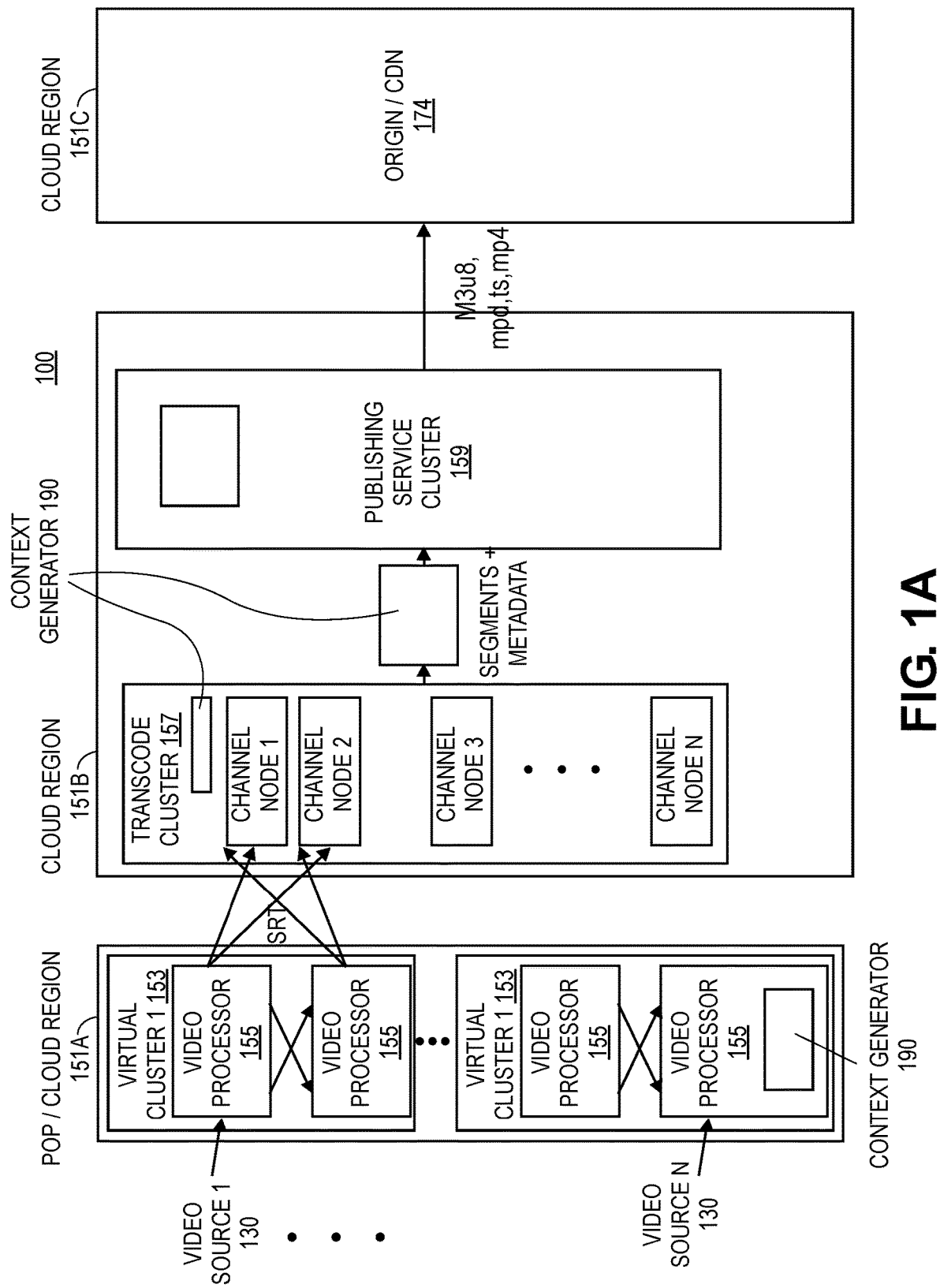
FIG. 1A is a diagram of one embodiment of a video streaming system supporting context generation.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

FIG. 1A is a first embodiment of a video streaming system to support context generation in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP 151A can be provided by an internet service provider or similar interface through which external resources and electronic devices can interact with the cloud computing environment.

In an example embodiment, the video streaming system 100 includes a set of virtual clusters 153, a transcode cluster 157, and a publishing service cluster 159. Each cluster can be composed of any number and combination of electronic devices including servers, storage devices, networking devices and related devices that make up a cloud computing environment. The virtual clusters 153 can support a set of video processors 155. These video processors 155 can software components that process the incoming video sources 130 and are hosted by the virtual clusters 153. The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130. Video processors 155 can implement context generation via context generators 190 as well as perform any number of other video processing tasks. While a single video processor 155 is illustrated as providing a context generator 190 any number of the video processors 155 can support this function.

Video sources 130 can be any type of video input in any format that is provided by any source device or set of devices. For example, video sources can be provided by a set of content providers, which are sets of devices operated by an entity that produces a video source 130 to be processed by the video streaming system 100. In some cases, the video sources 130 can be provided directly or indirectly by a set of capture devices such as live programming (e.g., sporting events). Any content provider, capture device, or similar set of devices providing the video sources 130 can execute or be in communication with a device executing a context generator 190. A context generator 190, as further described herein, generates context information for an input video source. This context generator 190 process can be implemented at any number of points within the video streaming system 100 such that contextual information about the video can be utilized in making decisions and taking actions associated with the video source 130.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, the publishing service can format the video streams using video encoding formats M3u8, MPD, TS, MP4 and similar video encoding formats. As used herein video, audio/video, and similar terms are used interchangeably to include video formats that may also encompass audio aspects.

As shown in FIG. 1A, a set of context generators 190 can be executed at the transcode cluster 157 or between the transcode cluster 157 and the publishing service cluster 159. The context generators 190 as described further herein, generate context information based on a processing of the image and audio content of the respective video stream. The context information to provide information about content within the video stream, such as identifying that a video stream relates to a football game, or mor specifically shows a touchdown in a football game.

Figure 1B:
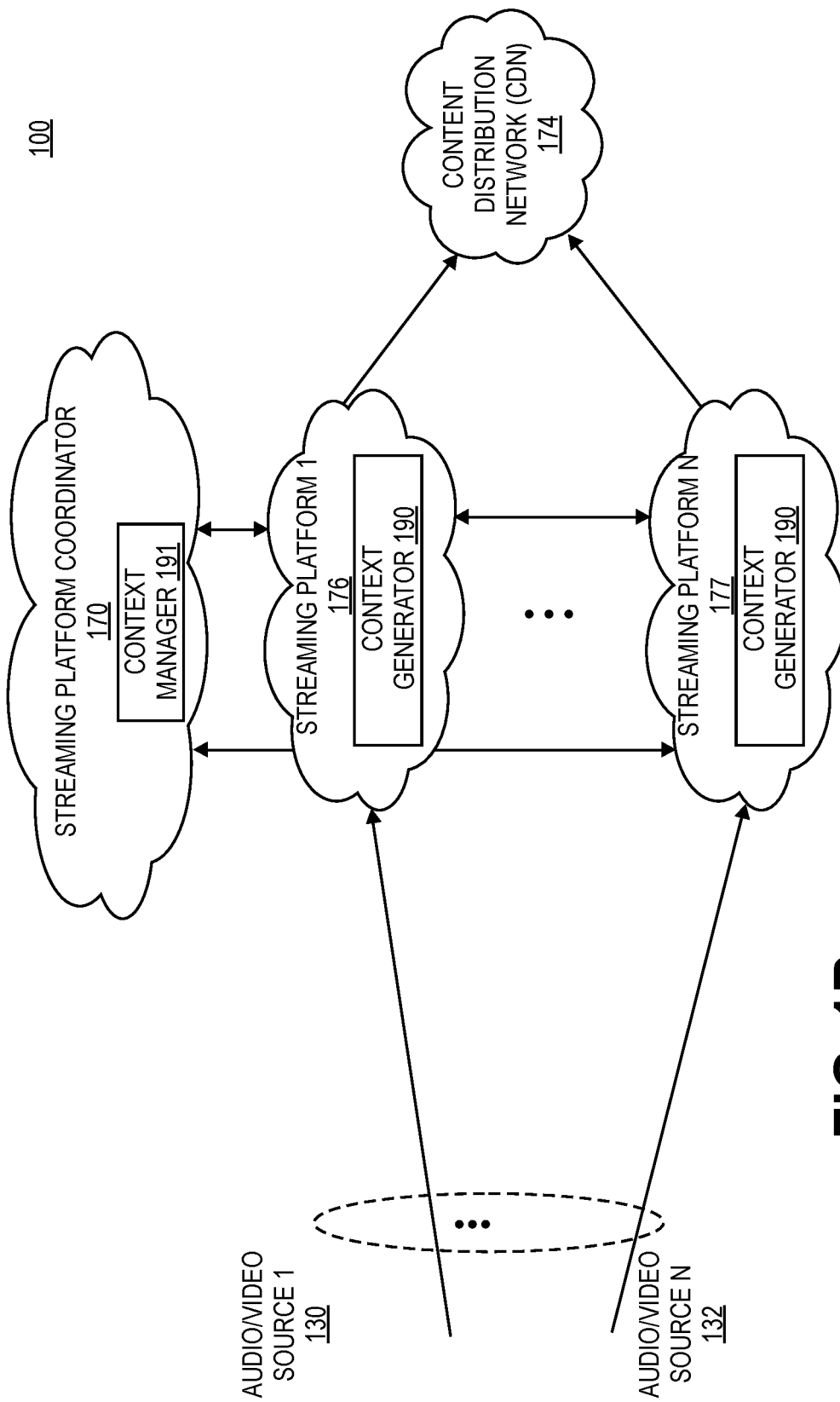
FIG. 1B is a diagram of another embodiment of a video streaming system containing multiple video streaming platforms.

FIG. 1B illustrates another embodiment of a video streaming system containing multiple video streaming platforms. A video streaming system 100 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain a context generator 190, which is illustrated as a context generator 190 in streaming platforms 1-N, respectively. The context generator 190 is to generate context information for frames in the media as it is received from the video sources, caused by processing media workflows created for video sources in a video streaming platform as discussed in more details herein below, or in similar processing of the received media (i.e., video) as it is received from the video sources, handled by the streaming platforms, and forwarded via the content distribution network 174.

In some embodiments, the streaming platform coordinator 170 may contain a content manager 191 that manages the context generators 190 including configuration of the context generators as well as training or metric collection for the context generators 190 from processing media workflows in all video streaming platforms the streaming platform coordinator 170 interacts with, and the streaming platform coordinator 170 may manage or coordinate notifying a feedback mechanism or corrective components to address any inaccuracies in the context generation such that a retraining of the machine learning models associated with the context generators can be initiated. The context manager 191 can also coordinate resources related to the context generator 190 at different video streaming platforms. Where a feedback mechanism is available in the system 100 the context manager 191 or context generator 190 can send notification of failures or context mismatches to the feedback mechanism that may report the issues component to retrain the machine learning models or to an administrator. In cases where corrective components are available in the system 100, then the reporting of issues with the context generation can trigger machine learning model retraining and in some cases further processing to correct or ameliorate the identified issues. The reporting of metrics related to context generation can indicate the frequency, type, label, categorization, and similar information about the context generation, identifying information about the media or video source and frames in which the content is identified as well as other relevant information for context identification in the system 100.

Video Streaming Platform in a Cloud Computing Environment

A set of video streaming platforms is a main component of a video streaming system 100 as illustrated in FIG. 1B. The video streaming platforms 176 and the video streaming system 100 can perform any number of operations to process any number of input video sources 130-132 and output via a content distribution network 174 to reach any number of consuming devices and software applications. The operations performed on the video sources 130-132 can include the context generation process implemented by context generator 190. Each streaming platform 176 can execute any number of context generator 190s using workers or similar mechanism as described further herein. The context generators 190 can operate on a per streaming platform 176, per video source 130-132 or similar basis.

Figure 2:
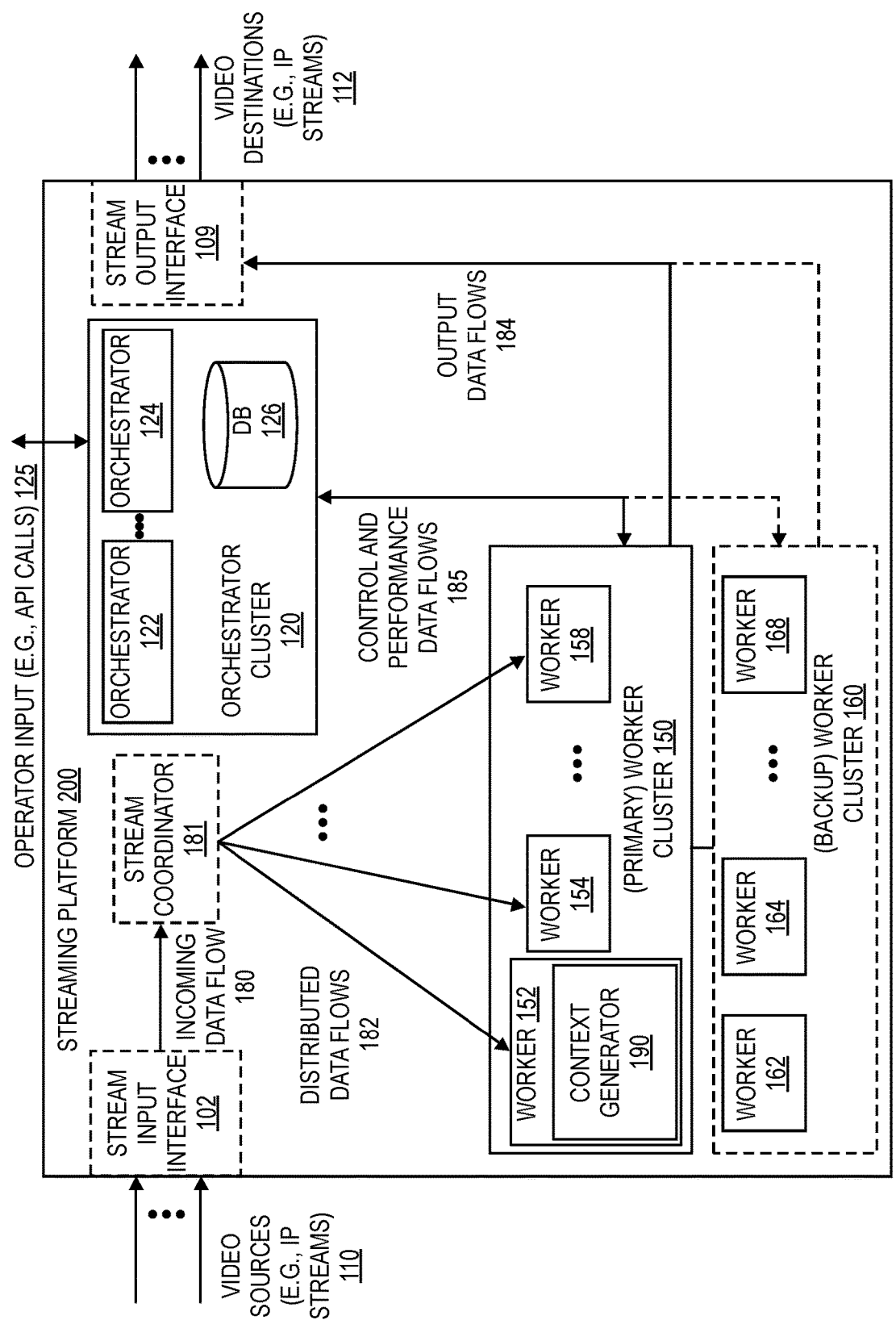
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD) and any other type or combination of pre-recorded audio/video content.

A video source may be "pushed" to the streaming platform 200 where the video source is IP packet streams such as the Moving Picture Experts Group (MPEG)—transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that in some embodiments orchestrator cluster 120 also contains a context manager 191 or context generator 190. The context manager 191 monitors the context generators 190 in the streaming platform 200 through collecting data from the workers (e.g., the performance data collected along with the control flows, as the control and performance data flows illustrated at reference 185) and receives updates on context generation as they occur. As context information is generated, the context manager 191 and/or context generator 190 can initiate a transfer of the context information to other components in the streaming platform 200 that may utilize or take action based on the context information (e.g., to an operator of the streaming platform 200 and/or to a streaming platform coordinator). While the context manager 191 is illustrated a standalone entity of the orchestrator cluster 120, the context generator 191 may be integrated with other entities such as orchestrators 122-124. Additionally, a portion of the context manager 191 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may also receive input from an operator separately from the streaming platform coordinator 170. The operator may receive input in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

- Mandatory parameters describing the type of the video source (e.g., MPEG-2, MPEG-4, H.265, and etc.), and location of the video source (e.g., ingest protocol, IP address, URI, and etc.).
- Indication of whether and how to enable subtitle processing and/or enable advertisement insertion processing for the video source.
- The desired video and audio transcoding operations (e.g., how many audio/video layers, the desired output characteristics for each such as video frame size/rate and bitrate, the relevant portion of the incoming data flow to use if applicable) for the video source.
- The desired contention protection operations for the published output (e.g., Microsoft© PlayReady, Adobe© Access DRM, AES-128 Encryption for HTTP live streaming, etc.).
- The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone generate context information while processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Context Generation in a Video Streaming Platform

The embodiments provide a system and process for context generation for input video streams. The embodiments use machine learning models to detect context information such as object and dialogue in a video source and determine a set of 'actions' to be associated with the video frames for an output video stream. The video frames are correlated with audio in the video stream that is converted into text to provide accurate context information. The context information can be in any format or organization including a context aware word cloud and context oriented dynamic actions. The term 'actions,' as used herein refer to activities that are identified within the images or audio of the input video stream and in particular the frames and audio in the video stream that is selected for processing. An example of context information that can be generated is identification of a touchdown in a football game that is shown in a video stream. When the frames of the video stream display a football player (i.e., an identified type of object) crossing into an endzone and the accompanying audio includes a commentator discussing a 'touchdown' the context generator can identify this context information and label the frames of the video stream with this context information indicating that the activity of a 'touchdown' is associated with the selected frames. Any number of objects, text, or similar context information can be associated with a set of frames and accompanying audio from a video stream. A response that could be automatically generated in response to identifying the action of the touchdown can include the insertion of a video graphic overlay or similar process that affects or is derived from the video stream.

The embodiments are able to employ machine learning (e.g., advanced deep belief neural networks and transfer learning) to detect objects in video frames. The embodiments also utilize advanced word detection models and natural language processing (NLP) techniques to generate text of speech associated with the video. The embodiments extract relevant phrases from audio from the frames. The combination of object detection along with language identification provides a highly accurate context information generation (e.g., a word/phrase cloud) for consumption at any frame for external/internal services (such as SCTE-35 based advertisement services) (i.e., external or internal relative to the streaming video platform) to have accurate context information for associated video streams to implement intelligent and dynamic actions insertion.

Prior art video streaming services do not provide context information extracted from the content of video frames. Video streams have only state metadata that is manually added to a video stream during creation of the stream. The embodiments provide dynamic real time context information that is extracted from frames of a video stream using machine learning to provide actionable insights base on the context information (e.g., in the form of word clouds).

In the embodiments, machine learning models (e.g., advanced deep belief neural networks) and transfer learning are utilized to detect objects and text and to determine actions based on scenes from input video frames. The embodiments leverage NLP and machine learning models to extract and convert dialog into text and correlate the text to the detected objects from the video frames. Using heuristics and historical information, the embodiments derive context information (e.g., a word cloud) that will be provided as meta-data by frame or set of frames for external consumption. As the context information will be based on frames of video/audio it will provide accurate context information for the frame. This context information in the form of the word clouds or similar context information can be leveraged by external services to provide services around the video stream in real-time or in live-to-VOD streams. The embodiments can leverage the cloud to automate this service and this will help in concurrently providing context sensitive information such as the word/phrase cloud to multiple services in real time with automatic scaling.

Figure 3:
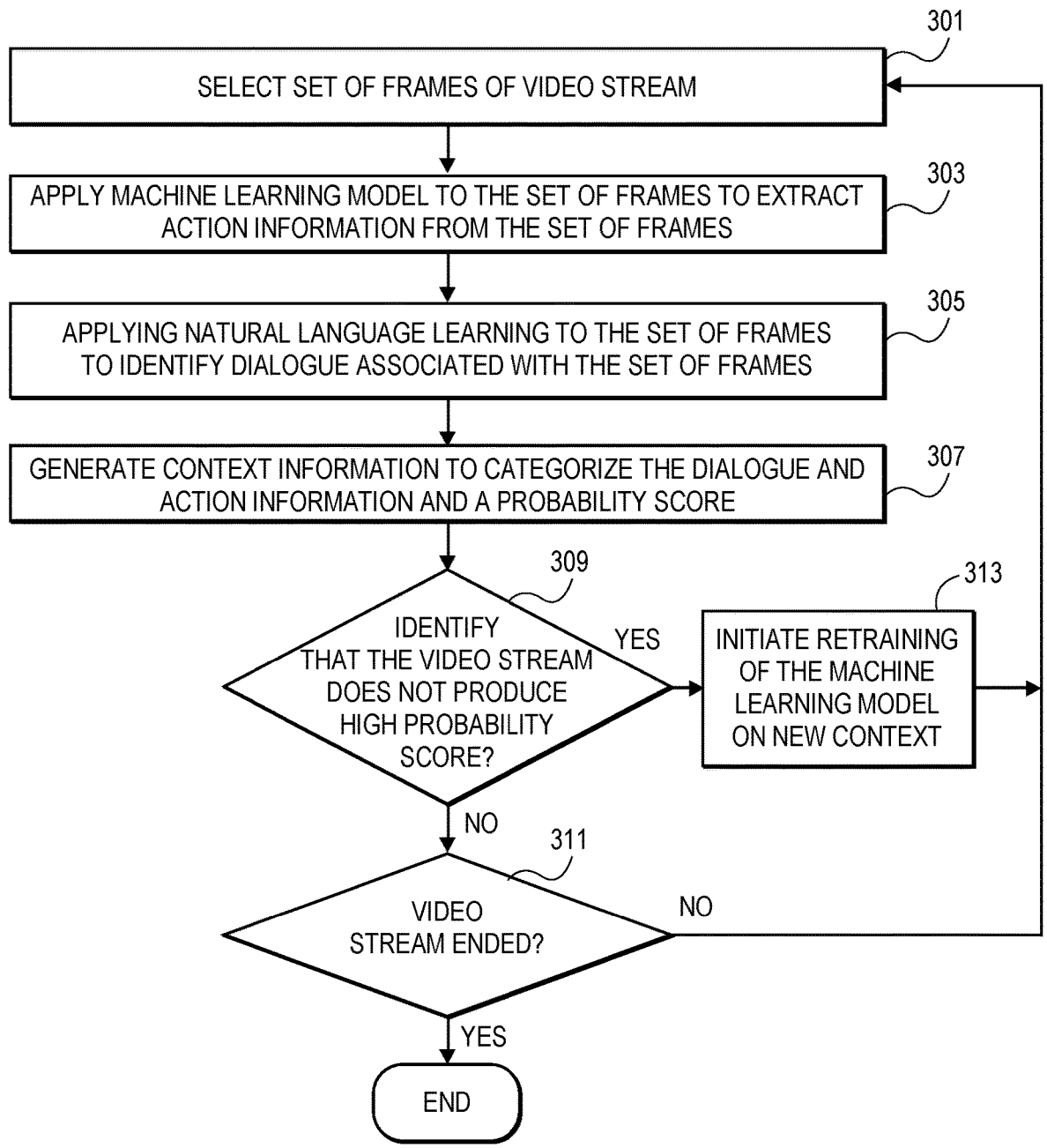
FIG. 3 is a flowchart of one embodiment of a process for executing a context generator.

FIG. 3 is a flowchart of one embodiment of a process for generating context information. The process is illustrated at a high level to represent the overall function of the context generation process in a video streaming system 100. The video streaming system 100 receives media (e.g., a video source or stream) from a content producer or similar video source and selects a set of frames from that video source to be processed (Block 301). A sequential processing is illustrated by way of example for clarity and conciseness. A "frame" of the video stream, as used herein, is an image composed of a matrix of pixels in time series with other frames to form the video. The video stream received from content producers can be encoded in any format and can have any size or organization. In some cases, the video stream can be formatted to satisfy legal agreements between content producers and content distributors who stream the media on their platform (e.g., via a content delivery network (CDN)) and/or to meet the technical requirements of the distributors who stream the media on their platform. The input video stream can be processed to determine activities, objects, and other context information at any rate or interval. In some embodiments, each frame is analyzed for determination of context information, while in other embodiments, groupings of frames are selected for assessment at defined intervals.

The context generator can determine (e.g., extract or measure) a set of values of a set of features of the selected set of frames for input into a machine learning model. Any type of machine learning model can be utilized. In some embodiments, a neural network (e.g., a deep learning neural network) or similar machine learning model can be utilized. The machine learning model is trained on particular types of video streams (e.g., live sports, news, scripted programming, or similar video content) at any level of granularity (e.g., trained specifically for professional football in contrast to college football). Any provided information about a video stream can be utilized to select an appropriate trained machine learning model. In some embodiments, a special machine learning model for identifying types of video content can be utilized as a first step to select a more specifically trained machine learning model.

The trained machine learning model is provided the set of features and/or frames as input (Block 303). Any number of frames and any set of features can be selected for input to the trained machine learning model. Features that are selected and identified in the input frames can include quantization parameters, motion vectors, bitrate, scene cuts, derived parameters, video quality scores from preceding or related frames in the video source, deblocking parameters, transform coefficients, slice sizes, block sizes, frame type, block type, and similar features. These features are selected for real time computation or extraction from the input video frames and can be derived without significant computational latency such that they can be input into the machine learning model without significant delay to the handling of the video source.

The trained machine learning model identifies a set of actions or similar context information from the input set of frames. In some embodiments, the trained machine learning model can also generate a confidence score for the identified actions and context information. The confidence score can have a defined range (e.g., 0 to 100) that indicates the probability of the accuracy of the identification of the respective action or context information.

In addition, a natural language processing (NLP) or similar natural language learning process is applied to the audio associated with the selected frames, if any exists (Block 305). A dialogue or set of words can thereby be identified that is spoken in proximity to the selected frames. The actions and dialogue can then be processed by heuristic algorithms based on historical information to generate a set of categories for the actions, dialogue, and other context information that has been generated for the selected set of frames (Block 307). The categories can then be associated with the set of frames by storing the categories in meta data of the frame. The categories (e.g., a set of labels or word cloud) can be stored along with other context information in the meta data of the set of frames.

In some embodiments, confidence or probability scores for each category or other context information can also be produced by the heuristic algorithms, machine learning model or similar sources and associated with the set of frames as meta data or using similar mechanisms. The probability or confidence score can be examined to determine whether the applied machine learning model requires retraining or whether a different machine learning model is to be applied (Block 309). If the probability or confidence score of the categories or other context information falls below a threshold level or outside or set of boundary for acceptable probability or confidence levels, then the retraining or reselection of the applied machine learning model for identifying actions can be triggered (Block 313). In some embodiments, a confidence score that is out of bounds for a single frame, a set of frames, an averaged probability or confidence score over many frames, or similar metric can be utilized to determine whether the machine learning model is to be retrained or reselected. The retraining of the machine learning model can be similar to the initial training of the machine learning model as further described herein below. The retraining can either update an existing machine learning model or generate a new machine learning model. Retraining can shift the set of features selected for input into the machine learning model.

A check is made after the processing of each set of frames to determine if there are more frames to process for the video source (Block 311). As long as the video source is continuing to stream to the destination, then the processing of the video stream can continue (Block 301). If the video stream completes, then the process can end the context generation process.

The context information, probability scores, and similar information generated by the context generator can be consumed by a context manager or other components of the video streaming platform. The context information can be utilized to make decisions on video stream handling including inserting or otherwise modifying the content of the video streams in response to identifying specific actions or categories in sets of frames in the video streams. The context generation process can be executed at any point between a video source and the publishing of the content into the content delivery network (CDN) including multiple instances of the context generator that can use a shared set of machine learning models or separate instances and/or separately trained machine learning models to generate the context information at different points in the vide stream platform. In particular, the context generation process can be employed at positions in the video streaming platform that can generate context information prior to the publishing of video source to enable modifications of the video source based on the context information prior to being published.

In further embodiments, the received video stream is broken down into individual frames and processed sequentially, in parallel, batches or similarly processed. In some cases, a pre-processing of the frame is performed to enhance the image for context generation. In some implementations, the frame is pre-processed by adjusting (e.g., increasing) image brightness, adjusting contrast, by converting the frame to greyscale, and/or similarly altered to facilitate context generation.

The context generation process can be used to identify context information in individual frames or sets of frames and/or to produce context information for a video stream in real time or in sufficient real time (e.g., within 1-200 ms). In some embodiments, the context generation process can be applied to determine context information for every individual frame of the video stream. However, in some other implementations, the method can be applied to assess every second/third/fourth/fifth/ . . . /$n^{th}$ frame of the video stream or similarly spaced batches of frames.

In some embodiments, the method can be applied to the entire frame of the video stream. However, in some other implementations, the context generation process can be applied to any number or variety of parts of a frame, which can be consistent from frame to frame or can vary over the frames of the video stream.

Figure 4:
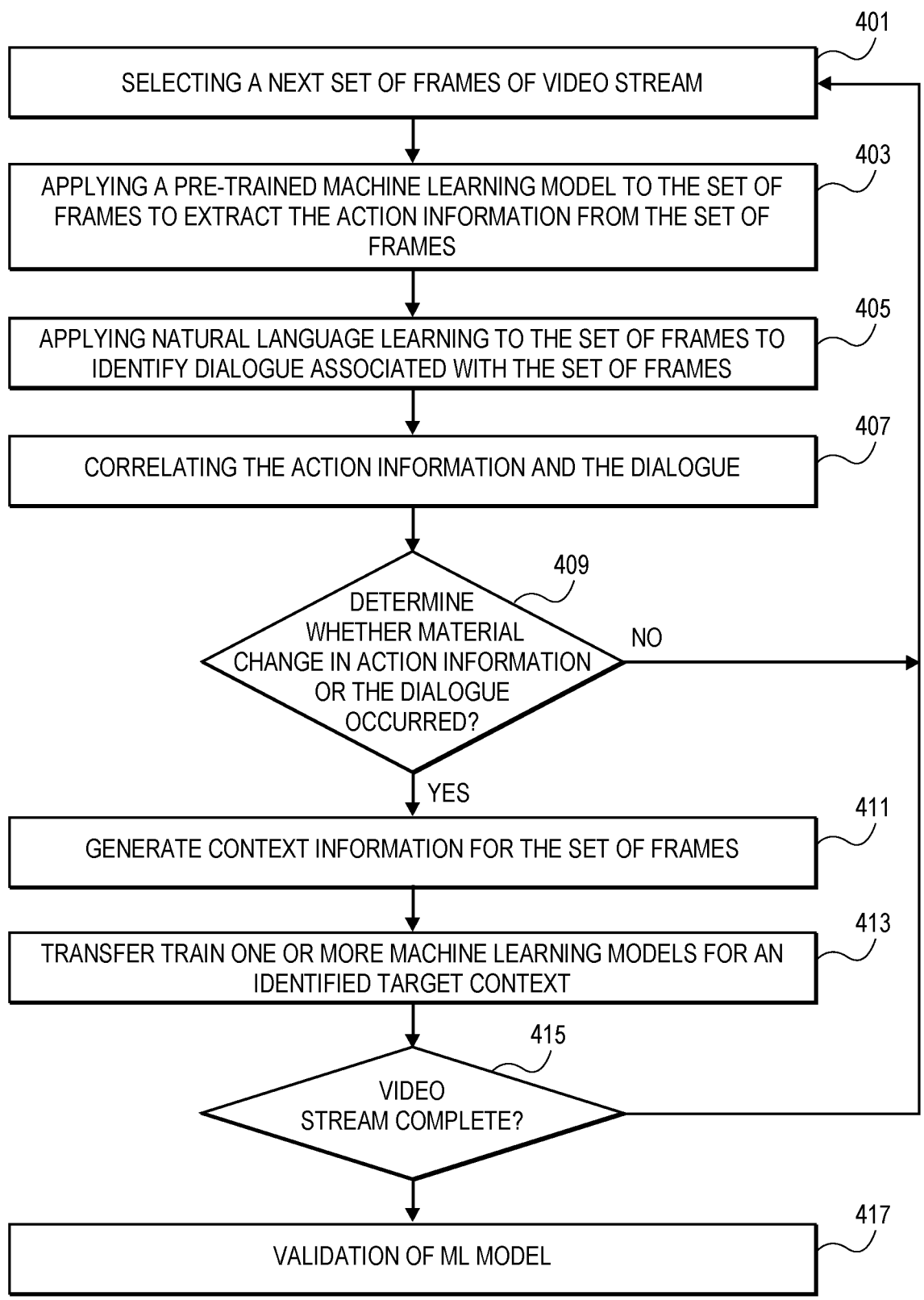
FIG. 4 is a flowchart of one embodiment of a process for training a context generator.

FIG. 4 is a flowchart of one embodiment of a process for training a machine learning model to perform context generation. The illustrated process provides an example process for a video streaming system that includes machine learning training for context generation. The process is illustrated at a high level to represent the overall function of the video streaming system 100. The video streaming system receives media (e.g., a video source or stream) from a content producer or similar video source. The training of the machine learning model can be implemented by the context generator, context manager, or any other component such as a separate training component within the video streaming system 100.

The video streaming system receives media (e.g., a video source or stream) from a content producer or similar video source and selects a set of frames from that video source to be processed (Block 401). A sequential processing is illustrated by way of example for clarity and conciseness. As with the context generation process, a "frame" of the video stream is an image composed of a matrix of pixels in time series with other frames to form the video. The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform. The input video stream can be processed to generate context information at any rate or interval. In some embodiments, each frame is analyzed for determination of actions and/or other context information, while in other embodiments, groupings of frames are selected for assessment at defined intervals.

The training process can determine (e.g., extract or measure) a set of values of a set of features of the selected set of frames to be associated with the frames to be input into a pre-trained machine learning model (i.e., a machine learning model previously trained on video sources of a given type) (Block 403). Any type of pre-trained machine learning model can be utilized. In some embodiments, a neural network or similar pre-trained machine learning model can be utilized. The pre-trained machine learning model can be selected as that with the most similar categorization to a target video source (e.g., a pre-trained professional football model can be utilized to train a college football model).

The pre-trained machine learning model is provided the set of frames as input. As mentioned, from the set of input frames, and/or the associated set of features can be applied to identify a set of actions in the selected frames. In some embodiments, the pre-trained machine learning model can also generate a probability or confidence score for the identified actions. The probability or confidence score can have a defined range (e.g., 0 to 100) that indicates the probability of the accuracy of the actions or similar context information identified in the set of frames. In addition, the audio associated with the set of frames can be processed by natural language learning, natural language processing (NLP), or similar processes to generate a dialogue of words associated with the set of frames.

The identified action and similar context information is correlated with the dialogue information (Block 407). The correlated information is checked to determine whether there is a change relative to previously processed frames (Block 409). If there is not a material change to the correlated information (i.e., the set of actions and dialogue are roughly the same), then the process continues to select the next set of frames (Block 401). If a material change is identified in the correlated action and dialogue information, then the process generates context information for the set of frames (i.e., adds label information as meta data to the set of frames) (Block 411). With the context information generated for the set of frames, a transfer learning process can be applied to transfer the pre-trained learning model to a new machine learning model for a target context (Block 413). Any process can be employed for transfer learning such that the function of the pre-trained learning model having a source domain can be applied to new machine learning model to be applied to the target domain.

In some embodiments multiple new machine learning models can be trained using the transfer learning process with each can trained on different combinations of input features along with the context information generated for the set of frames. Those models that perform the best may be favored for further utilization while other models that do not perform well can be discarded.

A check is made after the processing of each set of frames to determine if there are more frames to process for the video source (Block 415). As long as the video source is continuing to stream to the destination, then the processing of the video stream can continue (Block 401). The processing may conclude with validating the machine learning model (Block 417). If the video stream completes, then the process can end the training process for context generation. When the process completes each of the new trained machine learning models can be categorized as applicable to video sources similar to that of the input video source. For example, if the input video source was a sporting event (e.g., a football game), then new trained machine learning models can be categorized as applicable to sporting events, which can be used to select the new trained machine learning models for real time use for context generation (e.g., as described in relation to FIG. 3).

In further embodiments, the received video stream is broken down into individual frames and processed sequentially, in parallel, batches or similarly processed for training. In some cases, a pre-processing of the frame is performed to enhance the image for context generation. In some implementations, the frame is pre-processed by adjusting (e.g., increasing) image brightness, adjusting contrast, by converting the frame to greyscale, and/or similarly altered to facilitate assessment of context information.

In some embodiments, the training method can be applied to the entire frame of the video stream. However, in some other implementations, the training process can be applied to any number or variety of parts of a frame, which can be consistent from frame to frame or can vary over the frames of the video stream.

Electronic Devices Implementing Embodiments of the Invention

Figure 5:
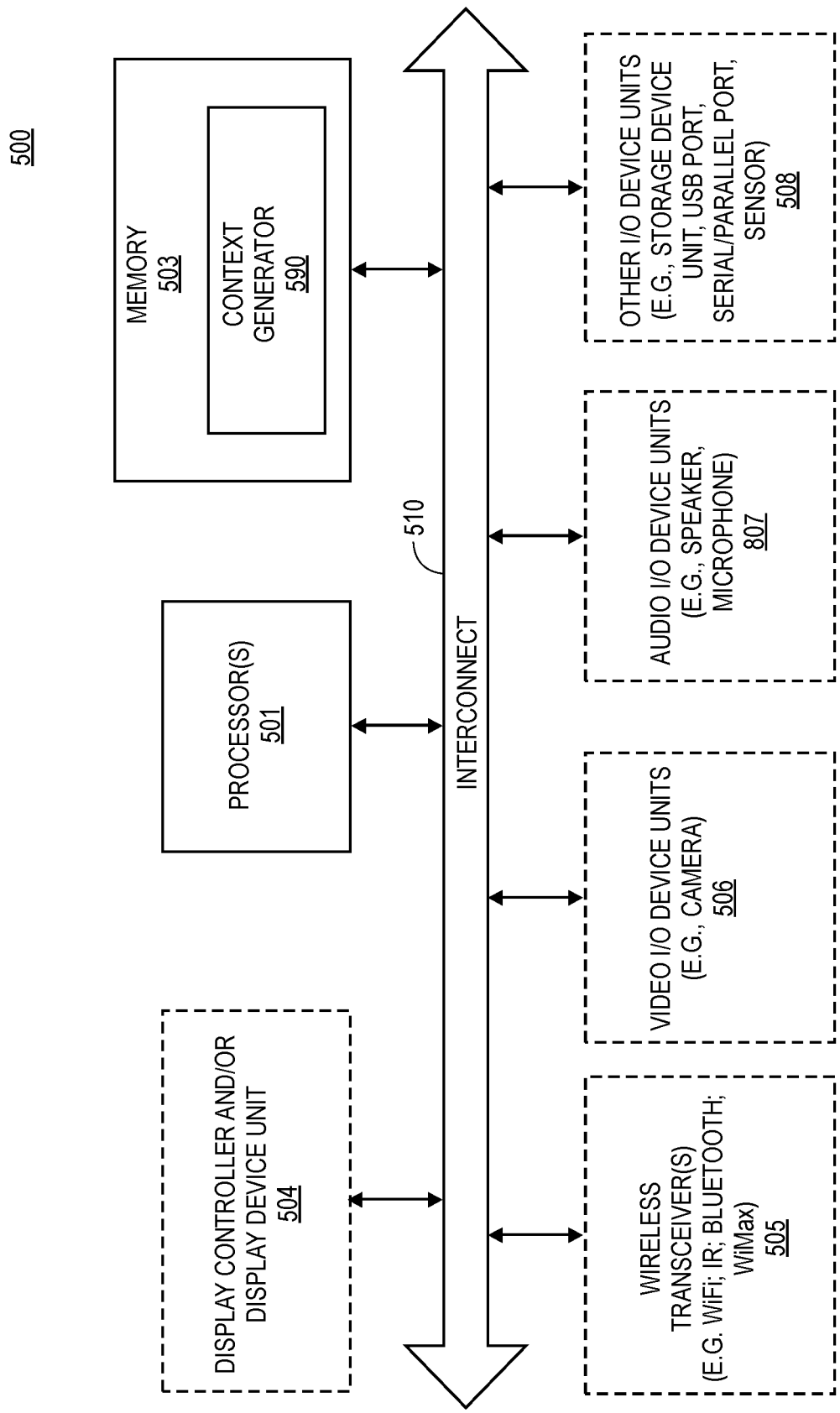
FIG. 5 is a block diagram illustrating an electronic device that may serve as a context generator of a video streaming platform in a cloud computing environment according to one embodiment of the invention.

FIG. 5 is a block diagram illustrating an electronic device that may serve as a context generator of a video streaming platform in a cloud computing environment according to one embodiment of the invention. The electronic device may be a computing device (e.g., a computer server) of a cloud computing environment). The system 500 may represent the context generator 590 and or context manager described above performing any of the processes or methods for training machine learning models and applying the trained machine learning models to generate context information in real time in a video streaming system described above. The system 500 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 500 is intended to show a high level view of many components of the computing system. However, it is to be understood that additional components may be present in certain implementations and furthermore, different arrangement of the components shown may occur in other implementations.

In one embodiment, the system 500 includes a processor 501, memory 503, and optionally device units 504-508 that are interconnected via a bus or an interconnect 510. A processor 501 may represent a single processor or multiple processors with a single processor core or multiple processor cores included therein. The processor 501 may represent one or more general-purpose processors such as a microprocessor, a central processing unit (CPU), or processing device. More particularly, the processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 501 may communicate with the memory 503, which in an embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the processor 501, or any other device units. For example, executable code and/or data of a variety of operating systems, device drivers, firmware (e.g., input output basic system or BIOS), and/or applications can be loaded in the memory 503 and executed by the processor 501. An operating system can be any kind of operating systems, such as, for example, Windows® operating system from Microsoft®, Mac OS®/iOS from Apple, Android® from Google®, Linux®, Unix®, or other real-time or embedded operating systems such as VxWorks.

The memory 503 contains a context generator 590, manager, or related components for training, which may contain instructions to perform the operations of these components as discussed herein above. The context generator 590 and related components may contain functional blocks that implement functions as described herein with relation to the video context generation process and related training processes discussed herein above. The processor 501 may instantiate the context generator 590 and related components to perform operations to as discussed herein above.

The system 500 may optionally further include input/output (I/O) devices such as the device units 504-508, including display control and/or display device unit 504, wireless transceiver(s) 505, video I/O device unit(s) 506, audio I/O device unit(s) 507, and other I/O device units 508 as illustrated. The wireless transceiver 505 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 500 may also include an ultrasound device unit (not shown) for transmitting a conference session code.

The video I/O device unit 506 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 507 may include a speaker and/or a microphone to facilitate voice-enabled functions, such as voice recognition, voice replication, digital recording, and/or telephony functions. Other optional devices 508 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 508 may further include certain sensors coupled to the interconnect 510 via a sensor hub (not shown), while other devices such as a keyboard or thermal sensor may be controlled by an embedded controller (not shown), dependent upon the specific configuration or design of the system 500.

The system 500 may be coupled to an orchestrator in an orchestrator as illustrated in FIG. 2. Additionally, the system 500 may be integrated within a streaming platform coordinator 170, similar to the context generator 190 illustrated in FIG. 1. The system 500 may perform methods discussed herein above relating to FIGS. 3 and 4.

Note that while the system 500 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A computer-implemented method for generating context information, the computer-implemented method comprising:
   determining, by one or more processors, one or more features corresponding to a plurality of frames from a received media stream;
   identifying, by the one or more processors, via a first machine learning model, one or more actions based on the one or more features and the plurality of frames;
   generating, by the one or more processors, audio data associated with the plurality of frames, wherein the audio data includes a dialogue or a plurality of words;
   processing, by the one or more processors, and by a second machine learning model, the one or more actions and the audio data to generate, by the second machine learning model, one or more categories for each frame of the plurality of frames, each category having a respective confidence score, wherein the second machine learning model is trained by correlating training action information and training audio data from a set of training frames, to extract context information based on correlations in the training action information and training audio data;
   based on determining that at least one of the one or more confidence scores falls below a threshold, re-training, by the one or more processors, the second machine learning model and obtaining, by the one or more processors, from the re-trained second machine learning model, new categories with respective confidence scores;
   storing, by the one or more processors, the one or more new categories, the corresponding one or more actions, and the audio data in metadata for each frame in a database; and
   publishing, by the one or more processors, the one or more frames including the metadata to a content distribution network.

2. The computer-implemented method of claim 1, wherein the one or more features based on the plurality of frames include at least one of: a quantization parameter, a motion vector, a bitrate, a scene cut, a derived parameter, a video quality score from a preceding frame or a related frame of the plurality of frames, a deblocking parameter, a transform coefficient, a slice size, a block size, a frame type, or a block type.

3. The computer-implemented method of claim 1, wherein the second machine learning model is trained by:
   accessing the set of training frames, each frame having training audio data;
   extracting action information from the set of training frames;
   correlating the action information and the training audio data; and
generating, based on the correlated action information and the training audio data, context information for the one or more set of training frames.

4. The computer-implemented method of claim 1, the computer-implemented method further comprising:
   generating, by the one or more processors, via the second machine learning model, the respective confidence scores; and
   comparing, by the one or more processors, each of the one or more confidence scores to the threshold.

5. The computer-implemented method of claim 1, wherein generating the audio data associated with the plurality of frames includes applying a natural language processing to an audio stream of the media stream.

6. The computer-implemented method of claim 1, the computer-implemented method further comprising:
   selecting, by the one or more processors, the second machine learning model based on content corresponding to the media stream.

7. The computer-implemented method of claim 1, the computer-implemented method further comprising:
   identifying, by the one or more processors, a specific action or a specific category in the plurality of frames; and
   modifying, by the one or more processors, content of the media stream based on the identifying the specific action or the specific category in the plurality of frames.

8. A non-transitory computer-readable medium storing instructions that, when executed by at least one processor, cause the at least one processor to perform operations for generating context information, the operations comprising:

determining one or more features corresponding to a plurality of frames from a received media stream;

identifying, via a first machine learning model, one or more actions based on the one or more features and the plurality of frames;

generating audio data associated with the plurality of frames, wherein the audio data includes a dialogue or a plurality of words;

processing the one or more actions and the audio data using a second machine learning model to generate one or more categories for each frame of the plurality of frames, each category having a respective confidence score, wherein the second machine learning model is trained by correlating training action information and training audio data from a set of training frames to extract context information based on correlations in the training action information and training audio data;

based on determining that at least one of the one or more confidence scores falls below a threshold, re-training the second machine learning model and obtaining, from the re-trained second machine learning model, new categories with respective confidence scores; and storing the one or more new categories and the corresponding one or more actions and the corresponding audio data in metadata for each frame in a database of a content distribution network.

9. The non-transitory computer-readable medium of claim 8, wherein the one or more features based on the plurality of frames include at least one of: a quantization parameter, a motion vector, a bitrate, a scene cut, a derived parameter, a video quality score from a preceding frame or a related frame of the plurality of frames, a deblocking parameter, a transform coefficient, a slice size, a block size, a frame type, or a block type.

10. The non-transitory computer-readable medium of claim 8, wherein the second machine learning model is trained by:

accessing the set of training frames, each frame having training audio data;

extracting action information from the set of training frames;

correlating the action information and the training audio data; and generating, based on the correlated action information and the training audio data, context information for the one or more set of training frames.

11. The non-transitory computer-readable medium of claim 8, the operations further comprising:

generating, by the one or more processors, via the second machine learning model, the respective confidence scores corresponding to each of the one or more categories; and comparing each of the one or more confidence scores to the threshold.

12. The non-transitory computer-readable medium of claim 8, wherein generating the audio data associated with the plurality of frames includes applying a natural language processing to an audio stream of the media stream.

13. The non-transitory computer-readable medium of claim 8, the operations further comprising:

selecting the machine learning model based on content corresponding to the media stream.

14. The non-transitory computer-readable medium of claim 8, the operations further comprising:

identifying a specific action or a specific category in the plurality of frames; and modifying content of the media stream based on the identifying the specific action or the specific category in the plurality of frames.

15. A computer system for generating context information, the computer system comprising:

at least one memory storing instructions; and one or more processors configured to execute the instructions to perform operations comprising:

determining, by the one or more processors, one or more features corresponding to a plurality of frames from a received media stream;

identifying, by the one or more processors, via a machine learning model, one or more actions based on the one or more features and the plurality of frames;

generating, by the one or more processors, audio data associated with the plurality of frames, wherein the audio data includes a dialogue or a plurality of words;

processing, by the one or more processors and by a second machine learning model, the one or more actions and the audio data to generate one or more categories for each frame of the plurality of frames, each category having a respective confidence score, wherein the second machine learning model is trained by correlating training action information and training audio data from a set of training frames, to extract context information based on correlations in the training action information and training audio data;

based on determining that at least one of the one or more confidence scores falls below a threshold, re-training, by the one or more processors, the second machine learning model and obtaining, by the one or more processors, from the re-trained second machine learning model, new categories with respective confidence scores; and storing, by the one or more processors, the one or more new categories and the corresponding one or more actions and the corresponding audio data in metadata for each frame in a database.

16. The computer system of claim 15, wherein the one or more features based on the plurality of frames include at least one of: a quantization parameter, a motion vector, a bitrate, a scene cut, a derived parameter, a video quality score from a preceding frame or a related frame of the plurality of frames, a deblocking parameter, a transform coefficient, a slice size, a block size, a frame type, or a block type.

17. The computer system of claim 15, the operations further comprising: wherein the second machine learning model is trained by:

accessing the set of training frames, each frame having training audio data;

extracting action information from the set of training frames;

correlating the action information and the training audio data; and generating, based on the correlated action information and the training audio data, context information for the one or more set of training frames.

18. The computer system of claim 15, the operations further comprising:

generating, by the one or more processors, via the second machine learning model, the respective confidence scores corresponding to each of the one or more categories; and comparing, by the one or more processors, each of the confidence scores to the threshold.

19. The computer system of claim 15, wherein generating the audio data associated with the plurality of frames includes applying natural language processing to an audio stream of the media stream.

20. The computer system of claim 15, the operations further comprising:
  selecting, by the one or more processors, the machine learning model based on content corresponding to the media stream.

* * * * *